US011000842B2

(12) United States Patent
Schnabel et al.

(10) Patent No.: US 11,000,842 B2
(45) Date of Patent: May 11, 2021

(54) METHOD FOR APPLYING PHOTOCATALYTIC COATINGS WITHOUT USING BINDERS, AND USE OF A COATING

(71) Applicant: LYNATOX GMBH, Ohrdruf (DE)

(72) Inventors: Tobias Schnabel, Bad Berka (DE); Christopher Hahn, Wöflis (DE)

(73) Assignee: LYNATOX GMBH, Ohrdruf (DE)

( * ) Notice: Subject to any disclaimer, the term of this patent is extended or adjusted under 35 U.S.C. 154(b) by 63 days.

(21) Appl. No.: 16/470,194

(22) PCT Filed: Dec. 13, 2017

(86) PCT No.: PCT/EP2017/082631
§ 371 (c)(1),
(2) Date: Jun. 14, 2019

(87) PCT Pub. No.: WO2018/109013
PCT Pub. Date: Jun. 21, 2018

(65) Prior Publication Data

US 2020/0016587 A1 Jan. 16, 2020

(30) Foreign Application Priority Data

Dec. 15, 2016 (DE) ..................... 10 2016 225 106.6

(51) Int. Cl.
*B01J 37/02* (2006.01)
*B01J 21/06* (2006.01)
*B01J 35/00* (2006.01)
*B01J 37/10* (2006.01)
*B01J 37/34* (2006.01)

(52) U.S. Cl.
CPC ......... *B01J 37/0228* (2013.01); *B01J 21/063* (2013.01); *B01J 35/004* (2013.01); *B01J 37/10* (2013.01); *B01J 37/342* (2013.01)

(58) Field of Classification Search
CPC .................................................... B01J 37/0228
See application file for complete search history.

(56) References Cited

U.S. PATENT DOCUMENTS

| | | | |
|---|---|---|---|
| 5,853,866 A | 12/1998 | Watanabe et al. | |
| 2009/0062109 A1 | 3/2009 | Boyd et al. | |
| 2011/0266136 A1* | 11/2011 | Varma ...................... | B01J 38/48 204/157.6 |
| 2012/0019917 A1 | 1/2012 | Riebel et al. | |
| 2016/0107152 A1 | 4/2016 | Tseng et al. | |

FOREIGN PATENT DOCUMENTS

| | | |
|---|---|---|
| DE | 3610338 A1 | 10/1987 |
| EP | 1118385 A1 | 7/2001 |

OTHER PUBLICATIONS

International Search Report, dated Jul. 20, 2018 for corresponding International Application No. PCT/EP2017/082631 with English translation.
Written Opinion of the ISA, dated Jul. 20, 2018 for corresponding International Application No. PCT/EP2017/082631.
K. Amini: "Manufacturing dye sensitized solar cells", Sep. 7, 2011, XP002781077.
German Office Action, dated Aug. 11, 2017, for corresponding German Application No. 10 2016 225 106.6.
German Office Action, dated Jul. 30, 2020, for corresponding German Application No. 10 2016 225 106.6 with English translation.

* cited by examiner

*Primary Examiner* — Nathan T Leong
(74) *Attorney, Agent, or Firm* — Intellectual Property Law Group LLP

(57) ABSTRACT

The invention relates to a method for applying titanium dioxide-based photocatalytic coatings to a carrier material without using binders. The invention also relates to the use of a coating. According to the invention, a titanium dioxide suspension together with a carrier liquid is sprayed onto a hot carrier in the form of a fine aerosol so that the carrier liquid flash evaporates and titanium dioxide particles of the titanium dioxide suspension are flash sintered onto the carrier material, water being used as the carrier liquid and the carrier material having a temperature of 150 to 250° C. during spraying. According to the invention, a porous and yet stable layer for a catalyst for an efficient and rapid degradation of pollutants is produced.

20 Claims, No Drawings

METHOD FOR APPLYING PHOTOCATALYTIC COATINGS WITHOUT USING BINDERS, AND USE OF A COATING

CROSS-REFERENCE TO RELATED APPLICATIONS

This application is a U.S. National Phase application, under 35 U.S.C. § 371, of International Application no. PCT/EP2017/082631, with an international filing date of Dec. 13, 2017, and claims benefit of German Application no. 10 2016 225 106.6 filed on Dec. 15, 2016, each of which is hereby incorporated by reference for all purposes.

FIELD OF INVENTION

The invention relates to a method for binder-free application of titanium dioxide-based photocatalytic coatings to a support material.

The invention also relates to the use of a coating.

BACKGROUND

Titanium dioxide-based photocatalytic coatings are of great economic significance for diverse fields of technical application. Important spheres of application are, for example, the production of coatings on glass and glazing elements in dwelling construction or for products of the automobile industry for generating superhydrophobic layers in a variety of support materials. A disadvantage affecting the production of highly active photocatalytic layers with a high concentration of titanium dioxide is the poor mechanical integrity of the coating.

For titanium dioxide coatings it is known practice to apply a suspension of titanium dioxide in volatile solvents, such as methanol, and then to sinter the layer in a high-temperature environment. With this method, however, the layers that can be produced are inevitably mechanically unstable, with low abrasion resistance, thus greatly limiting the fields of use and necessitating renovation of the coatings at regular intervals.

To this end, for example, K. Amini, "Manufacturing dye-sensitized solar cells", discloses a coating method in which a titanium dioxide suspension is sprayed on as a coating for a solar cell and sintered.

One known technique for generating more robust and more stable layers involves the admixing of a binder, such as water glass or siloxanes, for example. Disadvantages in this case are that the titanium dioxide particles become enveloped by the binder used, and hence that the photocatalytic coating has only restricted efficacy.

Furthermore, DE 10 2014 100 385 A1 discloses a plasma coating method for depositing a functional layer of a substrate, and a device for carrying out the method. In this case an atmospheric plasma and an inert carrier gas are used, enabling on the one hand the introduction of very high energies into the coating material in order to initiate a chemical reaction, and on the other hand a controllable chemical reaction in the absence of atmospheric oxygen in the plasma. The coating material for forming the functional layer is fed directly via a feed into the plasma, which is generated in a nozzle, in the absence of oxygen.

With this method it is possible to generate very stable, planar surfaces which, however, have a low photocatalytic activity, because the surfaces have very low porosity.

U.S. Pat. No. 5,853,866A discloses a method for producing a multifunctional material. US 2012/019917 A1 discloses a method for producing a translucent composite material. EP 1 118 385 A1 discloses a method for producing a photocatalytically active material. US 2009/0062109 A1 discloses a method for producing a catalytic material. US2016/0107152 A1 discloses a method for producing a photocatalytic substrate. DE 36 10 338 A1 discloses a platelike catalyst for diminishing the oxides of nitrogen in flue gases.

SUMMARY OF INVENTION

It is an object of the invention to improve a method of the aforementioned kind. A further object of the invention is to improve a use of the aforementioned kind.

The object is achieved in accordance with the invention, with regard to the method, by a method having the features specified in claim 1. The object is achieved in accordance with the invention, with regard to the use, by the features specified in claim 9.

Advantageous embodiments of the invention are subjects of the dependent claims.

DETAILED DESCRIPTION OF SPECIFIC EMBODIMENTS

With the method, a suspension of titanium dioxide based on a liquid is sprayed in the form of a fine aerosol onto a hot support, the carrier liquid used being water. In this procedure, the liquid undergoes flash evaporation and the titanium dioxide particles of the titanium dioxide suspension undergo flash sintering onto the support material.

The titanium dioxide layer generated using the method combines high uniformity with high surface quality. In comparison to the techniques employed to date, the photocatalytic effect achieved is substantially more efficient and the mechanical stability achieved is high, with a high abrasion resistance in particular being produced. Surprisingly it has emerged that the titanium dioxide layer obtained in this way is not only inherently stable, and in particular cannot be wiped off, but also adheres particularly well to the support material. The layer produced has a high porosity, and so the substances for treatment are able to penetrate deep into the material. The titanium dioxide layer generated with the method, therefore, is extremely suitable as a porous and yet stable layer for a catalyst with which it is possible to achieve efficient and rapid pollutant degradation.

Because the suspension is binder-free, the photocatalytically active particles do not become enveloped by the binder. As a result, a more rapid and more gentle coating is achieved, relative to the methods used hitherto.

The method is notable for a series of advantages. These advantages include:

There is no need for a separate sintering operation. Another consequence of this is a reduction in the conversion of anastase crystals (tetragonal holohedral crystals, also termed octahedrite) into rutile, a frequently occurring mineral from the mineral class of the "oxides and hydroxides". The mineral crystallizes in the tetragonal crystal system with the chemical composition $TiO_2$, and develops vertically streaked crystals which usually take the form of short to long prisms, and very frequently develops crystal twins in the form of polysynthetic, lamellar and cyclic triplets, quadruplets and sextuplets, but also granular to massive mineral aggregates.

The efficacy of the photocatalytic coating is greater.

The layer thicknesses can be set very precisely and graduated more exactly.

The flash evaporation produces porous layers, enabling pollutants to better penetrate the photocatalytic layer, so that pollutant degradation is efficient and rapid.

The method can be automated.

The layers applied are mechanically stable and resistant to washing off.

The method can be employed for all support materials which are stable up to a defined temperature.

The method is sparing with resources, using only small amounts of titanium dioxide.

One advantageous version of the method uses a titanium dioxide suspension composed of water with a fraction of 5 to 20 mass % of titanium dioxide particles.

With this it is possible to achieve uniform layers of high quality and high mechanical strength.

During the sprayed application, the support material is advantageously brought to a temperature which lies above the boiling temperature of the carrier liquid. Where the carrier liquid used in accordance with the invention is water, the temperature is in the range from 150 to 250° C. As a result, a short working time and high efficacy are ensured.

In one advantageous embodiment of the method, the heat is generated in the support itself, preferably by the support being traversed by an electrical current. It is possible, accordingly, to boost the quality of the coating still further, since the temperature of the support can be kept constant during the coating operation.

The coating produced with the method is distinguished by a series of advantages. These advantages include, in particular:

the attainable layer thickness and layer bonding are no longer dependent on the processing speed, and so even extensive catalysts can be produced;

by means of precise setting of the temperature, the curing process is able to take place under ideal conditions without the occurrence of uncontrolled modifications in the crystal, and this enables more effective control.

In the case of the coating of nonrusting steels and also of passivated metals, particularly in the case of titanium, further advantages arise, such as good chemical resistance toward corrosion, and also, because of the low electrical conductivity, a high resistance, for greater ease of electrical heating, and a high reflectivity, for more effective utilization of the deeper-lying catalyst layers.

The use of a titanium dioxide-based coating on a support material, produced by the method of the invention, takes place in accordance with the invention for a catalyst for pollutant degradation.

An exemplary embodiment of the invention is elucidated in more detail below.

The example explains the coating of a support material which consists of a fine-mesh metal lattice. Lattices of this kind are highly suited to use for the treatment of liquids and gases flowing through them, for the purpose, for example, of air and water purification.

The lattice consists of a net of stainless steel wire. The mesh size is 0.25 mm and the wire diameter is 0.16 mm. The metal lattice is rectangular and fixed in on two opposite sides, with a flow through the lattice of current, which heats the metal lattice to a temperature of around 200° C. Using a commercial spray gun, the titanium dioxide suspension is sprayed in the form of a fine aerosol, consisting of water and a titanium dioxide powder, onto the hot metal lattice. The water here undergoes flash evaporation and the titanium dioxide powder which remains combines in a sintering process with the support material. A uniform layer of titanium dioxide is generated on the support material. Sprayed application is repeated as many times as needed to achieve the desired layer thickness. It is possible in this way to generate layer thicknesses of 0.5 to 40 $g/m^2$ with high mechanical strength.

The invention claimed is:

1. A method for binder-free application of titanium dioxide-based photocatalytic coatings to a support material, where a titanium dioxide suspension with a carrier liquid is sprayed in a form of a fine aerosol onto a hot support, so that the carrier liquid undergoes flash evaporation and the titanium dioxide particles of the titanium dioxide suspension undergo flash sintering onto the support material, the carrier liquid being water, characterized in that during the sprayed application, the support material has a temperature of 150 to 250° C., thus forming a porous and yet stable layer for a catalyst for pollutant degradation, heat is generated in the support material itself, and the support material is traversed by an electrical current.

2. The method as claimed in claim 1, characterized in that during the sprayed application, the support material has a temperature which lies above the boiling temperature of the carrier liquid.

3. The method as claimed in claim 2, wherein the titanium dioxide suspension has a fraction of 5 to 20 mass % of the titanium dioxide particles.

4. The method as claimed in claim 3, wherein the method is repeated.

5. The method as claimed in claim 2, wherein the method is repeated.

6. The method as claimed in claim 2, wherein a latticelike support material is used.

7. The method as claimed in claim 2, wherein nonrusting material is used as the support material.

8. The use of a titanium dioxide-based coating on a support material, produced by the method as claimed in claim 2, for a catalyst for pollutant degradation.

9. The method as claimed in claim 1, characterized in that the titanium dioxide suspension has a fraction of 5 to 20 mass % of the titanium dioxide particles.

10. The method as claimed in claim 9, wherein the method is repeated.

11. The method as claimed in claim 9, wherein a latticelike support material is used.

12. The method as claimed in claim 9, wherein nonrusting material is used as the support material.

13. The use of a titanium dioxide-based coating on a support material, produced by the method as claimed in claim 9, for a catalyst for pollutant degradation.

14. The method as claimed in claim 1, characterized in that the method is repeated.

15. The method as claimed in claim 14, wherein a latticelike support material is used.

16. The method as claimed in claim 14, wherein nonrusting material is used as the support material.

17. The use of a titanium dioxide-based coating on a support material, produced by the method as claimed in claim 14, for a catalyst for pollutant degradation.

18. The method as claimed in claim 1, characterized in that a latticelike support material is used.

19. The method as claimed in claim 1, characterized in that nonrusting material is used as the support material.

20. The use of a titanium dioxide-based coating on a support material, produced by the method as claimed in claim 1, for a catalyst for pollutant degradation.

\* \* \* \* \*